United States Patent
Baudu et al.

(10) Patent No.: US 6,216,980 B1
(45) Date of Patent: *Apr. 17, 2001

(54) SYSTEM FOR CLOSING A PIVOTING THRUST REVERSER DOOR

(75) Inventors: Pierre André Marcel Baudu, Le Havre; Patrick Gonidec, Montivilliers; Guy Bernard Vauchel, Le Havre, all of (FR)

(73) Assignee: Societe Hispano-Suiza (FR)

( * ) Notice: Subject to any disclaimer, the term of this patent is extended or adjusted under 35 U.S.C. 154(b) by 0 days.

This patent is subject to a terminal disclaimer.

(21) Appl. No.: 08/941,698

(22) Filed: Oct. 1, 1997

(30) Foreign Application Priority Data

Oct. 3, 1996 (FR) .................................................. 96 12047

(51) Int. Cl.$^7$ ....................................................... E05C 3/06
(52) U.S. Cl. ...................................... 244/110 B; 292/201
(58) Field of Search ..................................... 292/198, 201, 292/216, 144, 63, 66, 67, 68, 71, 109, 113, 114; 244/110 B, 129.4, 129.5

(56) References Cited

U.S. PATENT DOCUMENTS

| 3,113,352 | * | 12/1963 | Gibbs ..................................... 292/201 |
| 3,576,337 | | 4/1971 | Gudde . |
| 3,600,023 | * | 8/1971 | Gudde ..................................... 292/201 |
| 4,135,760 | * | 1/1979 | Grossbach ............................. 296/155 |
| 4,145,877 | * | 3/1979 | Montgomery ....................... 60/226 A |
| 4,541,673 | * | 9/1985 | Greiert ................................... 308/3 R |
| 4,796,932 | * | 1/1989 | Tame ...................................... 292/112 |
| 5,303,508 | * | 4/1994 | Porte ....................................... 49/109 |
| 5,404,714 | * | 4/1995 | Davies .................................. 60/226.2 |
| 5,524,431 | * | 6/1996 | Brusson ............................... 60/226.2 |
| 5,547,130 | * | 8/1996 | Davies ............................. 239/265.29 |
| 5,720,449 | * | 2/1998 | Laboure et al. ................. 244/110 B |
| 5,735,557 | * | 4/1998 | Harvey ................................... 292/216 |
| 5,997,054 | * | 12/1999 | Baudu ................................... 292/201 |

FOREIGN PATENT DOCUMENTS

| 2350935 | * | 10/1972 | (DE) ..................................... 292/351 |
| 534833 | * | 3/1993 | (EP) ..................................... 292/216 |
| 0 717 184 | | 6/1996 | (EP) . |
| WO 93/16279 | | 8/1993 | (WO) . |

* cited by examiner

*Primary Examiner*—Gary W. Estremsky
(74) *Attorney, Agent, or Firm*—Bacon & Thomas PLLC

(57) ABSTRACT

A system is disclosed for closing a pivoting door thrust reverser pivotally attached to a jet engine cowling including a latch mechanism that is movably connected to the jet engine cowling and movable between a first position in which the latch grips a forward portion of the thrust reverser door when the forward portion of the thrust reverser door is a predetermined distance from the fully closed position and a second position in which the latch mechanism exerts a force on the thrust reverser door to urge the thrust reverser door to the fully closed position. In this manner, a relatively large closing torque is exerted on a forward portion of the thrust reverser door by the movable latch mechanism. Since the force is applied a relatively large distance from the pivot axis of the thrust reverser door, the requisite torque may be generated by actuator having a relatively low force.

18 Claims, 3 Drawing Sheets

SYSTEM FOR CLOSING A PIVOTING THRUST REVERSER DOOR

BACKGROUND OF THE INVENTION

The present invention relates to a system for closing a pivoting thrust reverser door pivotally attached to a jet engine cowling, more particularly such a system which grips the thrust reverser door when it is adjacent to its closed, forward thrust position and exerts a force on a forward portion of the door to securely close and lock the thrust reverser door in the forward thrust position.

Pivoting doors for aircraft thrust reversers are well-known in the art and are typically incorporated into a jet engine cowling so as to pivot about a generally transverse axis between a closed, forward thrust position and an open, reverse thrust position in which the door opens a reverse thrust opening in the cowling and redirects at least a portion of the gases passing through a duct bounded by the cowling outwardly through the reverse thrust opening. The thrust reverser door is driven between the closed, forward thrust position and the open, reverse thrust position by an actuator attached to the door and to the structure of the engine cowling. Locks are utilized to keep the thrust reverser door in the closed, forward thrust position to prevent inadvertent deployment of the door to the reverse thrust position. Sealing is achieved by interposing one or more elastomer seals between the engine cowling structure and the thrust reverser door.

The actuator is typically a linear actuator and is pivotally attached to the cowling structure forwardly of the reverse thrust opening so as to swivel about its attachment point as the thrust reverser door moves between the closed and opened positions. The actuator is typically a linear actuator which exerts a force on the door along a central longitudinal axis of the linear actuator. The position of the actuator within the wall thickness of the jet engine cowling causes the linear force exerted on the door by the linear actuator to move closer to the pivot axis of the door as the thrust reverser door approaches the closed, forward thrust position, thereby reducing the torque exerted on the door by the linear actuator force. Under some aircraft operating conditions, the pivoting torque exerted on the thrust reverser door by the linear actuator may become insufficient to fully close the thrust reverser door in a rapid fashion. Also, under such conditions, the forces applied by the linear actuator on the jet engine cowling structure and the thrust reverser door may be of such magnitude to cause deformation of the cowling structure and the door.

The closing of the thrust reverser door is accompanied by compression of the elastomeric seals between the thrust reverser door and the cowling structure, thereby necessitating an additional torque applied to the thrust reverser door when approaching its fully closed condition in order to adequately compress the elastomeric seals. The above-described phenomenon is compounded by the need to "over-retract" the thrust reverser door, that is, to push it into the reverse thrust opening of the jet engine cowling more than ideally necessary and to compress the elastomeric seals in order to be able to lock the thrust reverser door despite any deformations in the cowling and/or the thrust reverser door and in order to minimize the force required to move the locking device between its locked and unlocked position. When fully locked in the fully closed position, the outer surface of the thrust reverser door will align itself with the outer surface of the engine cowling to provide an aerodynamically smooth outer surface for the cowling structure.

In order to resolve the known problems, solutions are available, but none completely resolve all of the problems. First, the force exerted by the linear actuators and the mechanical strengths of the cowling structure and the thrust reverser doors may be increased. However, this increases the weight and bulk of the thrust reverser structure causing higher aircraft fuel consumption and lower useful load capable of being carried by the Aircraft. Secondly, the operation of the gas turbine engine may be restricted during the thrust reverser door closure in order to lower the forces acting on the thrust reverser doors and thereby enabling the known linear actuators to reliably fully close the thrust reverser doors. However, such restriction may entail grave difficulties in actual aircraft practice. Such difficulties may arise when the aircraft is landing and the thrust reversers are in their reverse thrust positions and an unexpected obstacle appears in front of the aircraft. If the gas turbine engine operation is restricted, the pilot will be unable to apply the full power of the engine to close the thrust reverser doors to enable the aircraft to take off and avoid the obstacle without encountering a delay of several seconds. Thus, a need exists for a system for reliably closing the thrust reverser door without increasing the weight of the thrust reverser structure and without requiring restrictions of the gas turbine engine operation.

SUMMARY OF TIE INVENTION

A system is disclosed for closing a pivoting door thrust reverser pivotally attached to a jet engine cowling including a latch mechanism that is movably connected to the jet engine cowling and movable between a first position in which the latch grips a forward portion of the thrust reverser door when the forward portion of the thrust reverser door is a predetermined distance from the fully closed position, and a second position in which the latch mechanism exerts a force on the thrust reverser door to urge the thrust reverser door to the fully closed position.

In this manner, a relatively large closing torque is exerted on a forward portion of the thrust reverser door by the movable latch mechanism. Since the force is applied a relatively large distance from the pivot axis of the thrust reverser door, the requisite torque may be generated by actuator having a relatively low force. The relatively low forces may be generated by a small actuator thereby enabling the door structure, as well as the jet cowling structure, to be lightened. Thus the system does not entail any increase in weight of the jet engine cowling structure including the thrust reverser system.

The movable latch mechanism may include a pivoting latch with a generally "U-shaped" notch bounded by outer and inner legs with the pivoting latch movable between a gripping position wherein a roller attached to a forward portion of the thrust reverser door is engaged by the notch and a releasing position in which the forward portion of the thrust reverser door is disengageable from the notch thereby allowing the thrust reverser door to move toward the open, reverse thrust position. The pivoting latch may be attached to a slider mechanism so as to move in a generally radial direction relative to the engine cowling, the pivoting latch moving to its releasing position as the slide reaches its radially outermost position.

The pivoting latch may be pivoted about its axis by a cam surface on the latch engaging a portion of the engine cowling structure as the slide moves in its generally radial direction, or the latch may be pivotally attached to the engine cowling structure and pivoted by a separate linear actuator.

A known lock mechanism may be utilized in conjunction with the pivoting latch whereby when the latch is pivoted to its gripping position, it is physically restrained in the gripping position by the lock mechanism so as to lock the thrust reverser door in the fully closed, forward thrust position, thereby preventing any inadvertent deployment of the thrust reverser door toward the reverse thrust position.

The closing torque of the latch mechanism, combined with the torque exerted on the thrust reverser door by its linear actuator permits fully closing the thrust reverser door under more extreme aircraft operating conditions in which higher gas pressure and increased ambient air pressure acts on the thrust reverser door. The latch of the latch mechanism may grip the forward portion of the thrust reverser door prior to any compression of the seals between the thrust reverser door and the engine cowling structure whereby the additional force exerted on the door by the latch mechanism also serves to achieve the requisite compression of the seals.

The movable latch mechanism is contained completely within the wall thickness of the engine cowling and does not require any major changes in the engine cowling design. If it is assumed that the engine cowling has a wall thickness of "e", the forward portion of the thrust reverser door may be gripped by the movable latch mechanism when the forward portion is at a distance of at least 15% of "e" away from its fully closed, forward thrust position. The torque on the door exerted by the latch mechanism enables the door linear actuator to be reduced in size and capacity, allowing the further lightening of the thrust reverser system.

During thrust reverser door closing, the latch is moved to its releasing position and, if slidably attached to the jet engine cowling structure, is moved to its radially outermost position. In this position, the latch will grip a forward portion of the thrust reverser door when it is at a predetermined distance from its fully closed position and the latch will be pivoted to its gripping position and, if slidably mounted, the latch mechanism will be moved radially inwardly thereby exerting a force on the thrust reverser door urging it toward its fully closed position. In order to move the thrust reverser door to the reverse thrust position, the latch, if slidably mounted on the jet engine cowling, is moved to its radially outermost position thereby pushing the forward portion of the thrust reverser door toward the reverse thrust position and, once the latch is in its radially outermost position, the latch is pivoted to its releasing position thereby enabling the door actuator to continue movement of the thrust reverser door toward the reverse thrust position.

DETAILED DESCRIPTION OF THE PREFERRED EMBODIMENTS

Figure 1:
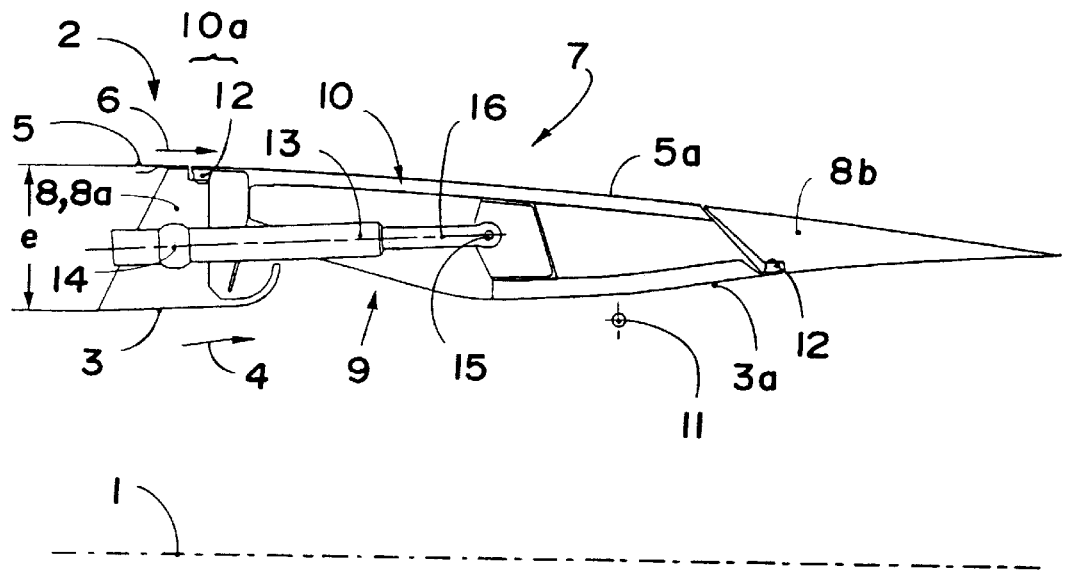
FIG. 1 is a partial, cross-sectional view illustrating a pivoting door thrust reverser with the door in the fully closed, forward thrust position.

FIG. 1 illustrates a pivoting door-type thrust reverser in which the gas turbine engine (not shown) has a longitudinal axis 1 and is enclosed by a jet engine cowling 2 having a generally circular cross-sectional configuration centered on the axis 1. The cowling 2 has an inner wall 3 which forms an outer boundary of a duct through which gases flow in the direction of arrow 4, and an outer wall 5 over which ambient air flows in the direction of arrow 6. The forward direction of the engine cowling is toward the left, as illustrated in FIG. 1. The cowling 2 forms a reverse thrust opening 9 with structure 8 located adjacent to the forward side of the reverse thrust opening 9 connecting the inner and outer walls 3, 5. A rear portion of the cowling 8b is located to the rear of the reverse thrust opening 9.

The thrust reverser 7 comprises a door 10 pivotally attached to the cowling 2 so as to pivot about generally transverse pivot axis 11. The door has inner wall 3a and outer wall 5a. The thrust reverser door 10 pivots between a forward thrust position, illustrated in FIG. 1, and a reverse thrust position in which the forward portion 10a is moved radially outwardly away from the cowling 2 while a rear portion of the door (to the right of the pivot axis 11) moves inwardly into the duct so as to redirect at least a portion of the gases flowing through the duct outwardly through the reverse thrust opening 9. The cowling 2 has a wall thickness "e" adjacent to the forward side of the reverse thrust opening 9. A linear actuator 13 is pivotally attached to the cowling structure 8 so as to pivot about lateral axis 14, the actuator having an extendable and retractable piston rod that is pivotally connected to the thrust reverser door 10 at pivot 15. Seals 12 are interposed between the forward portion 10a of the thrust reverser door 10 and the cowling 2, as well as the rear portion of the thrust reverser door 10 and the cowling portion 8b to prevent leakage of the gases passing through the gas flow duct when the thrust reverser door 10 is in the closed, forward thrust position.

The thrust reverser door 7 is moved between its closed, forward thrust position and its open, reverse thrust position by extension and retraction of the rod of the linear actuator 13. The force of linear actuator 13 acts along its longitudinal axis 16. In its closed position, the thrust reverser door 10 is locked by its forward portion 10a to a rear facing portion 8a of the cowling structure 8. The longitudinal axis 16 of the actuator 13 passes through its swivel connection 14, as well as the pivot connection 15.

The actuator 13 must be housed within the inner and outer walls 3, 3a, 5, 5a when the thrust reverser door 10 is in its closed, forward thrust position and must insure the complete opening of the door 10 to its fully opened, reverse thrust position. These requirements for the location of the linear actuator 13 causes it to be oriented almost parallel to the longitudinal axis 1 when in the position illustrated in FIG. 1. Thus, when the thrust reverser door 10 approaches its closed, forward thrust position, the force axis 16 of the linear actuator moves closer to the pivot axis 11 of the thrust reverser door, thereby diminishing the torque exerted on the door by the force from the linear actuator.

Figure 2:
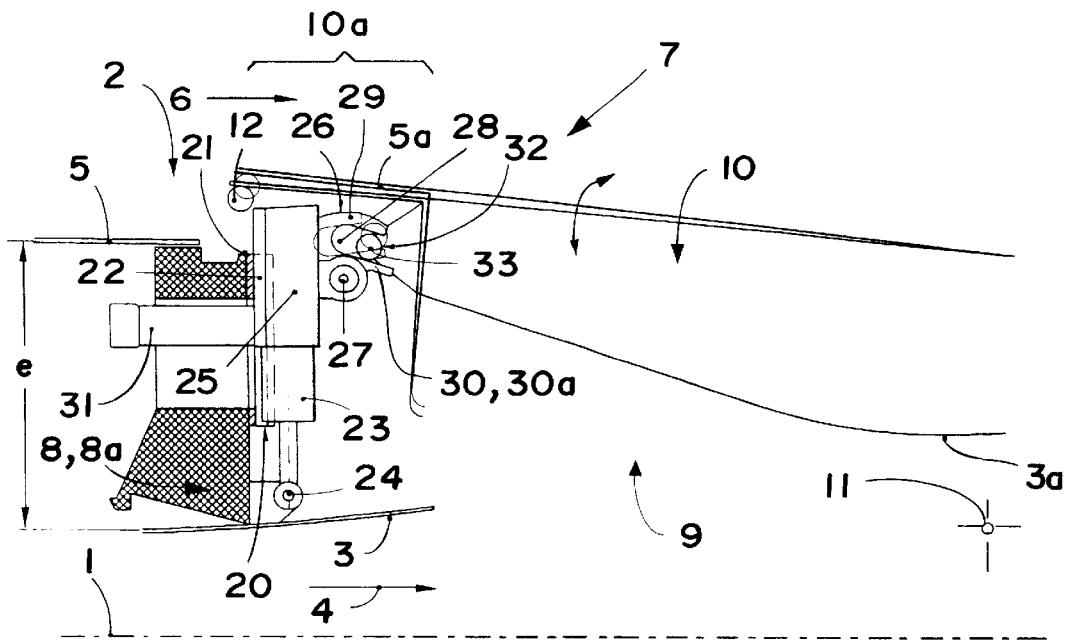
FIG. 2 is a partial, longitudinal, cross-sectional view illustrating a first embodiment of the present invention with the forward portion of the thrust reverser door approaching its fully closed position.
Figure 3:
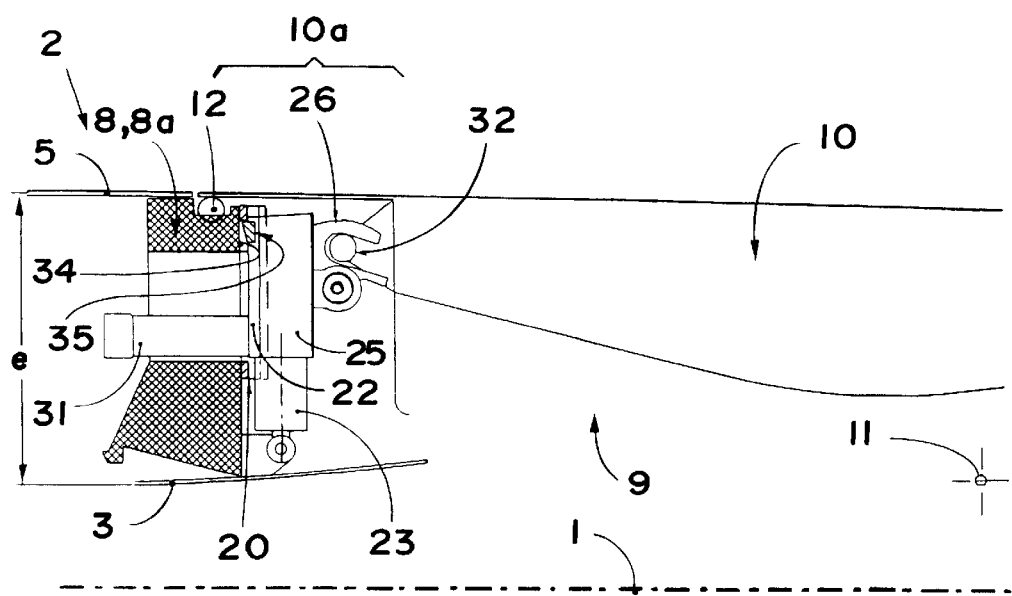
FIG. 3 is a view similar to FIG. 2, illustrating the positions of the elements when the thrust reverser door is in its fully closed, forward thrust position.

An initial embodiment of the present invention is illustrated in FIGS. 2 and 3. Elements having the same or similar functions to the elements previously described relative to FIG. 1 have been assigned the same identifying numerals. In this embodiment, a slide 20 is attached to the rear facing portion 8a of the cowling structure and extends in a generally radial direction with respect to the longitudinal axis 1. The outermost end of the slide 20 is denoted at 21 and is located just inwardly of the outer wall 5a of the thrust reverser 10 when the door is its fully closed, forward thrust position.

A slider 22 is slidably mounted in the slide 20 so as to be movable between a first, radially outermost position, illustrated in FIG. 2, and a second, radially innermost position, illustrated in FIG. 3. The movement of the slider is accomplished by actuator 23 which has an extendable and retractable rod attached to the stationary structure 8 at pivot 24. Thus, it can be seen that extension and retraction of the rod of actuator 23 will cause the slider 22 to move between its first and second positions.

A known locking mechanism 25 that is conventionally used to lock the thrust reverser door 10 in its fully closed position is also mounted on the slider 22. The lock 25 comprises a latch 26, pivotally attached to the body of the lock so as to pivot about a hinge 27. Pivoting latch 26 forms a generally "U"-shaped notch 28 bounded by an outer leg 29 and an inner leg 30, the legs 29 and 30 comprising arcs of a circle centered on the hinge axis. The lower leg 30 has a straight portion 30a extending outwardly beyond the distal end of the outer leg 29. Actuator 31 provides the driving mechanism for the latch 26 to cause it to pivot about the hinge 27 between a gripping position, wherein it grips a forward portion of the thrust reverser door and a releasing portion which the thrust reverse door is released. A roller 32 is attached to the forward portion of the thrust reverser door 10 and is configured so as to be engaged in the notch 28.

With reference to FIGS. 2 and 3, the thrust reverser door 10 is closed by extending the slider 22 to its radially outermost position and pivoting the latch to its releasing position. As the thrust reverser door 10 reaches a predetermined distance from its fully closed, forward thrust position, roller 32 will contact inner leg portion 30a, at which point latch 26 is pivoted to its gripping position wherein the roller 32 is retained in the notch 28. Actuator 23 will then retract the slider 22, along with the latch 26 to the radially innermost positions, illustrated in FIG. 3, in which the forward portion of door 10a and the thrust reverser door 10 are in their fully closed, forward thrust positions. The locking system 25 will retain the pivoting latch 26 in this position so as to lock the thrust reverser door in the forward thrust position. During this motion, the roller 32 rolls on a straight end of the outer leg 29 until it reaches the curved portions of the outer and inner legs, at which point of the latch 26 becomes self-closing. A force exerted on the door 10 tending to urge it toward its open, reverse thrust position, will urge the latch 26 toward its gripping position, thereby positively locking the door in the closed, forward thrust position.

Opening the thrust reverser door is the reverse of the above procedure. It is possible to move the pivoting latch to its releasing position thereby enabling the linear actuator 13 to move the thrust reverser door 10 such that the roller 32 is removed from the notch 28. However, this may cause deformation of the stationary structure, because the full power of the linear actuator 13 is used at that time. To avoid this problem, operation of the liner actuator 13 can be prevented until just before the slider 22 reaches its outermost position. This sequence allows releasing the latch 26 of any load due to its engagement with the roller 32.

In an emergency, the latch 26 may be moved to its releasing position before movement of the slider 22 thereby enabling the deployment of the thrust reverser door 10 as quickly as possible.

In FIG. 3, it can be seen that slide 20 has a locking recess 34 near its outermost extremity, which recess 34 cooperates with a locking member 35 movably mounted on the slider 22. The locking member 35 engages the recess 34 when the slider 22 is in its radially innermost position so as to lock the slider in this position. The locking member 35 may be biased by a spring, or the like to engage the recess 34. In order to move the slider 22 to its outermost position, the locking member 35 is retracted by known electromagnetic, or mechanical means so as to disengage it from the recess 34.

Figure 4:
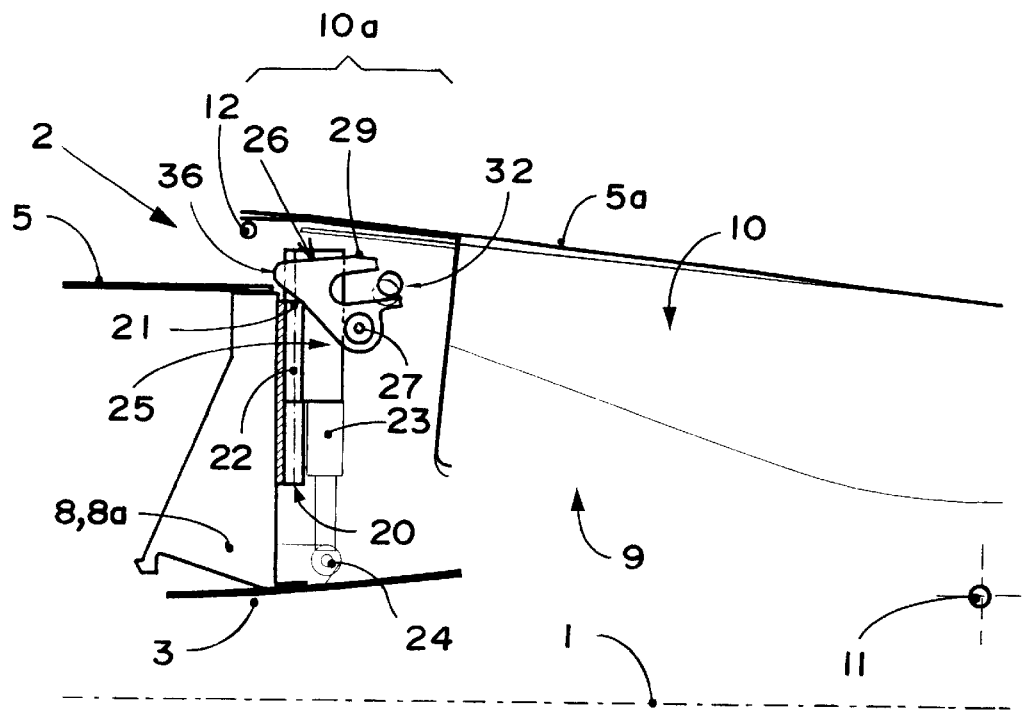
FIG. 4 is a partial, longitudinal, cross-sectional view illustrating an alternative embodiment of the system according to the present invention.

An alternative embodiment is illustrated in applicant's FIG. 4. In this embodiment, the pivoting latch 26 is pivoted by the action of a cam, thereby enabling the actuator 31 to be eliminated. The latch 26 has cam surface 36 thereon, which may be formed integrally with the latch 26 and which bears against a surface of the slide 20 including its outermost end portion 21. As can be seen, as the slider 22 is moved radially inwardly, the action of cam surface 36 on slide 20 will cause the latch 26 to pivot about its hinge point 27 so as to move between the releasing position, illustrated in FIG. 4, and a gripping position, in which the latch 26 pivots in a clockwise direction about the pivot axis. A torsion spring or the like, may be interposed between the hinge 27 and the latch 26 to urge it in a counterclockwise direction relative to the pivot axis such that the cam surface 36 is biased into contact with the slide 20. With this mechanism, the pivoting movement of the latch 26 is controlled by the generally radial movement of slider 22 on the slide 20. In this embodiment, movement of the latch 26 from its gripping position is positively prevented when the slider 22 is in its radially innermost position. This offers a high degree of safety in preventing the inadvertent deployment of the thrust reverser door 10. Although not illustrated, the locking mechanism illustrated in FIG. 3, including the recess 34 and the locking member 35, may also be included with the embodiment illustrated in FIG. 4.

Figure 5:
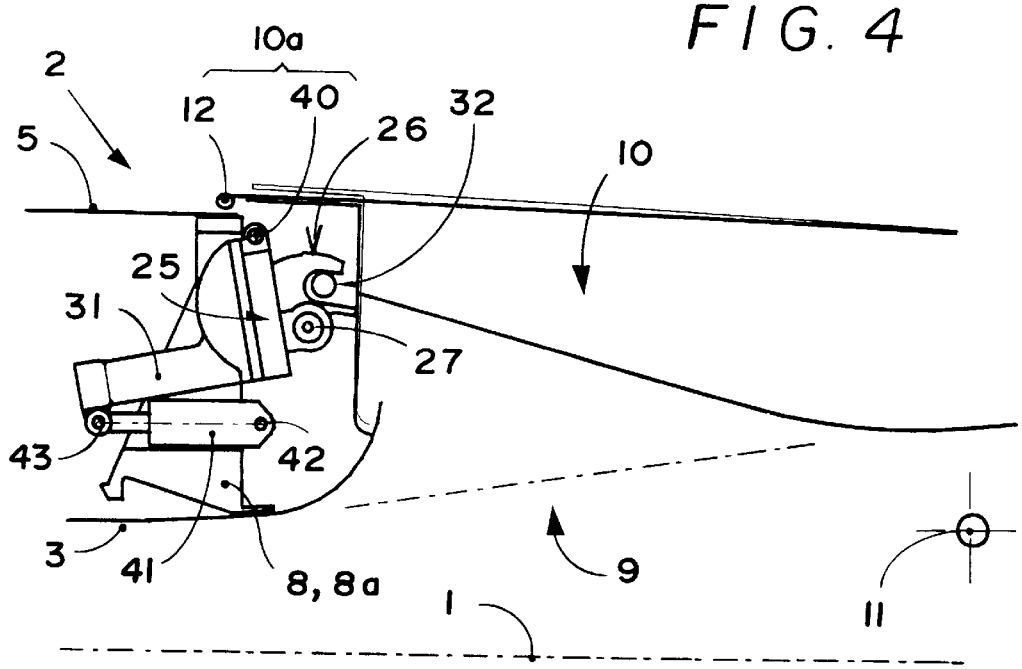
FIG. 5 is a partial, longitudinal, cross-sectional view illustrating another alterative embodiment of the present invention.

In an alternative embodiment illustrated in FIG. 5, the slide 20 and the slider 22 are eliminated, and the lock 25 including pivoting latch 26 are pivotally attached to the cowling structure 8a so as to pivot about transverse axis 40. As in the previous embodiments, latch 26 is also pivotable relative to the lock 25 about the hinge axis 27 by actuator 31. The pivoting motion of the assembly is controlled by actuator 42 attached to the cowling structure 8 and having an extendable and retractable rod attached to the lock structure at 43. As in the embodiment illustrated in FIGS. 2 and 3, actuator 31 controls the pivoting movement of the latch 26 about its hinge axis 27. However, in this embodiment, actuator 41 controls the pivoting motion of the assembly about the pivot axis 40. Such pivoting motion of the entire assembly moves the pivoting latch 26, once it has been moved into its gripping position, radially inwardly so as to exert a closing torque on the thrust reverser door 10 urging it toward its fully closed position.

Figure 6:
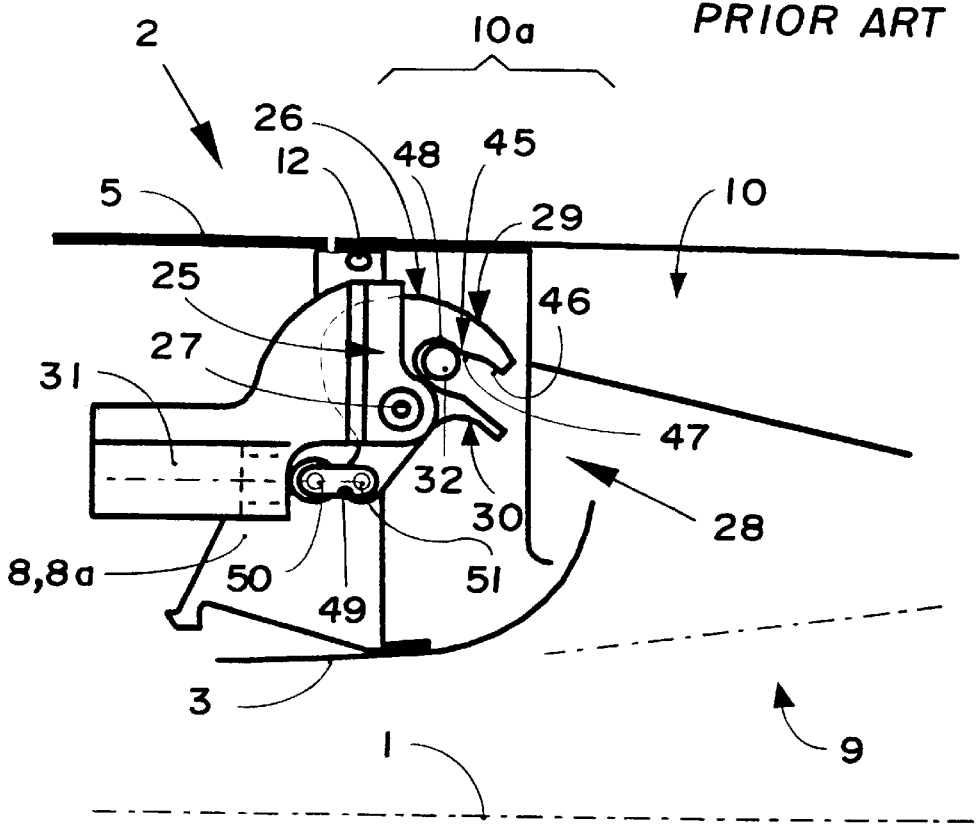
FIG. 6 is a partial, longitudinal, cross-sectional view illustrating another embodiment of the present invention.

Another alterative embodiment of applicant's invention is illustrated in FIG. 6. In this embodiment, the lock mechanism 25 is fixedly attached to the cowling structure 8 and, as in the previous embodiments, latch 26 is pivotally mounted so as to pivot about hinge axis 27. Such pivoting movement of the latch 26 is achieved by linear actuator 31 connected to a lower portion of the latch 26 by link 49 and pivot 51. Pivot 50 connects the opposite end of the link 49 to the extendable and retractable rod of actuator 31. In this embodiment, the latch 26 has a larger angular range of movement about the hinge axis 27 than that in the previously described embodiments. The outer leg 29 comprises an inner surface 45 with a first concave portion 46 extending from a distal end inwardly and a second concave portion 48 extending from the first convex portion 46 to the base of the "U"-shaped notch. A cusp 47 is formed at the juncture of the first and second convex portions 46, 48. The concave portion 48 is shorter than the concave portion 46 and as it moves away from the cusp 47, the surface also moves away from the hinge axis 27.

In this embodiment, when the thrust reverser door 10 is approaching its closed position, the roller 32 contacts the straight portion of the inner leg 30 and the actuator 31 then rotates the latch 26 clockwise about its hinge axis 27 toward its gripping position. The roller 32 (and the forward portion 10a of the thrust reverser door 10) are then pulled toward the fully closed position by the action of the inner surface 45 of the outer leg 29. As the roller 32 moves to the top of the cusp 47, which urges the door into an "over-retracted" position, and moves onto the concave portion 48 and against the bottom of the notch 28, any force exerted on the thrust reverser door 10 urging it toward its opened position will cause the roller 32 to bias the latch 26 toward its gripping position. Thus, latch 26 is in a stable equilibrium position when gripping the roller 32 and requires no additional means to hold it in that position.

In the embodiments of applicant's invention utilizing a lock mechanism 25, instead of simultaneously carrying out the closing and the locking of the thrust reverser door, two separate locking mechanisms may be utilized, the first performing the door closure in the manner of the invention, and the second performing the locking in this position. Regardless of the selected embodiment, the lock 25 may also be mounted laterally on each side of the thrust reverser door 10, as long as the mechanisms are sufficiently displaced from the pivot axis 11 of the thrust reverser door 10 to generate a relatively large closing torque by means of a relative small force.

Although the slide 20 has been described as being "radial", quite obviously, it may be oriented obliquely with respect to the longitudinal axis 1. The slide 20 may be oriented generally parallel to a chord of an arc described by the motion of the pivot axis 33 of the roller 32 from the point where it is gripped by the latch 26 to where the door is fully closed, such allowing the reduction of the depth of the notch 28. The slide 20 and the actuator 23 may also be telescopic structures in order to increase the magnitude of their length of travel, enabling the gripping of the end 10a of the thrust reverser door even further from the cowling structure 8 and thereby reducing the force required by the door actuator 13.

The foregoing description is provided for illustrative purposes only and should not be construed as in any way limited this invention, the scope of which is defined solely by the appended claims.

We claim:

1. A closure system including a pivoting thrust reverser door pivotally attached to a jet engine cowling so as to move between a fully closed forward thrust position and a fully open reverse thrust position, the jet engine cowling forming a reverse thrust opening that is covered by the thrust reverser door when in the fully closed forward thrust position, the thrust reverser door having a forward portion extending outwardly from the jet engine cowling when in the fully open reverse thrust position, the system comprising:
    a locking mechanism including a latch which is movably connected to the jet engine cowling, said latch being movable between a first position in which the latch releases the thrust reverser door, a second position in which the latch grips the forward portion of the thrust reverser door when the thrust reverser door is at a partially open position a predetermined distance from the fully closed forward thrust position, and a third position in which the latch exerts a force on the thrust reverser door and thereby moves the thrust reverser door from the partially open position to the fully closed forward thrust position; and
    a latch moving device arranged to move the latch from the second position to the third position, the latch being arranged such that upon such movement the latch exerts a force on the thrust reverser door and moves the thrust reverser door from the partially open position to the fully closed forward thrust position.

2. The system of claim 1 further comprising:
    a compressible seal having an uncompressed thickness, said seal being located between the jet engine cowling and thrust reverser door when the thrust reverser door is near the predetermined distance, the seal being located so that it is compressed when the thrust reverser door is in the fully closed forward thrust position; and
    wherein the predetermined distance is greater than the uncompressed thickness of the seal.

3. The system of claim 1, wherein the jet engine cowling has a wall thickness e adjacent a forward side of the reverse thrust opening and wherein the predetermined distance is at least 0.15e.

4. The system of claim 1, wherein the latch is a pivoting latch with a generally "U"-shaped notch bounded by outer and inner legs.

5. The system of claim 4, wherein a distal end of the inner leg extends beyond a distal end of the outer leg.

6. The system of claim 4, the latch moving device further comprising:
    a slider slidably attached to the jet engine cowling so as to be movable between a first slider position and a second slider position, the pivoting latch being pivotally attached to the slider.

7. The system of claim 6, the latch moving device further comprising:
    a slider actuator connected to the slider so as to move the slider between the first and second slider positions.

8. The system of claim 6 further comprising a cam surface on the pivoting latch acting on a fixed portion of the jet engine cowling whereby the latch is moved to the releasing position as the slider approaches the first position and the latch is moved to the gripping position when the slider moves away from the first position.

9. The system of claim 8, the latch moving device further comprising a slider actuator connected to the slider so as to move the slider between the first and second positions.

10. The system of claim 6, the latch moving device further comprising:
    a) a slide located on the jet engine cowling with the slider slidably mounted on the slide, the slide having a recess; and
    b) a lock member on the slider releasably engageable with the recess such that, when the lock member engages the recess, the slider is locked in the second slider position.

11. The system of claim 4 wherein the latch moving device comprises a latch actuator connected to the pivoting latch.

12. The system of claim 11, the latch moving device further comprising:
    a slider slidably attached to the jet engine cowling so as to be movable between a first slider position and a second slider position, the pivoting latch being pivotally attached to the slider.

13. The system of claim 12, the latch moving device further comprising:

a slider actuator connected to the slider so as to move the slider between the first and second slider positions.

14. The system of claim 4 wherein the latch is pivotally connected to the jet engine cowling.

15. The system of claim 14, the latch moving device further comprising a latch actuator connected to the latch.

16. The system of claim 4, further comprising:

a roller attached to the forward portion of the thrust reverser door and located so as to be gripped by the pivoting latch.

17. The system of claim 16 wherein the outer leg has a roller gripping surface comprising:

a) A first concave portion extending inwardly from a distal end of the outer leg; and, b) a second concave portion extending from the first concave portion toward a base of the generally "U"-shaped slot, a cusp being formed at the juncture of the first and second concave portions.

18. The system of claim 17 wherein the inner leg has a roller contacting surface comprising:

a) a first portion having a concave configuration and located adjacent to a base of the generally "U"-shaped slot; and, b) a straight portion extending from the first portion to a distal end of the inner leg.

* * * * *